July 14, 1970 HSIN L. LI ET AL 3,520,750
NOVEL THERMOSETTING COMPOSITES AND PROCESS FOR MAKING
Filed Dec. 23, 1966 3 Sheets-Sheet 1

INVENTORS
HSIN LANG LI
DUSAN C. PREVORSEK
HENDRIKUS J. OSWALD
PAUL J. KOCH
GEORGE J. SCHMITT

BY *Arthur J. Plantamura*
ATTORNEY

United States Patent Office 3,520,750
Patented July 14, 1970

3,520,750
NOVEL THERMOSETTING COMPOSITES AND
PROCESS FOR MAKING
Hsin L. Li, Lake Hiawatha, and Dusan C. Prevorsek
and Hendrikus J. Oswald, Morristown, Paul J. Koch,
Mount Freedom, and George J. Schmitt, Madison, N.J.,
assignors to Allied Chemical Corporation, New York,
N.Y., a corporation of New York
Filed Dec. 23, 1966, Ser. No. 604,255
Int. Cl. B31f 43/00
U.S. Cl. 156—199                                    8 Claims

ABSTRACT OF THE DISCLOSURE

Cold-forming procedures for imparting shapes to thermosetting compositions are disclosed. A sandwich structure which has a thermosetting resinous core and thermoplastic face sheets is prepared. The thermoplastic face sheets are of sufficient thickness and strength so that the sandwich containing the thermosetting core between the face sheets may be cold-formed into shaped articles and such shape as is imparted to it is retained by the thermoplastic face sheets without external constraint on the shape as the thermosetting core is cured.

---

This invention relates to the forming of shaped articles comprising synthetic thermosetting resins. More particularly, the invention relates to the provision of a structure comprising a thermosettable plastic lamina which is sandwiched between thermoplastic layers or enclosing face sheets to form a composite which may be cold-formed into suitable shapes, and to the novel method of cold-forming shaped articles from said composite.

While the relatively fast techniques which are normally applied in metal forming have been utilized, in shaping thermoplastic resin blanks or sheets these approaches when applied in connection with thermosettable composition have been essentially impractical. The inability to utilize these techniques is largely due to the fact that thermosettable compositions lack the necessary physical characteristics, e.g. generally before curing they do not possess the necessary strength, draw characteristics, integrity to retain desired shape imparted thereto, etc. Accordingly, thermoset shapes have heretofore required considerable times in the mold to achieve permanency of shape as evidenced by the normal techniques now employed which require confining a thermosettable plastic shape for considerable periods of time in a heated mold of the desired shape until sufficient curing of the composition has occurred to prevent the shape from being altered after external constraint has been removed.

It is an object of the invention to provide a method for permitting the relative rapid production of shaped articles of thermosetting plastic compositions.

It is a more specific object of the invention to provide a novel method for the production of thermoset shapes at ambient temperatures which essentially obviates the shape constraining cycle normally required for curing thermosetting compositions.

It is another object of the invention to provide a thermosettable composite, which may readily be converted to desired shapes at ambient temperatures, characterized by a thermosettable layer sandwiched between thermoplastic layers which are of sufficient strength to permit the desired shape imparted to the composite to be retained as the thermosettable layer is converted to the thermoset condition without requiring external constraint.

It is still another object of the invention to provide a composite laminate comprising a core of thermosetting composition and face sheets of thermoplastic composition which is capable of being cold-formed, i.e., at ambient temperatures, into useful shapes in an expeditious manner.

Additional objects and advantages of the present invention will be apparent from the following description and claims and including the illustrations provided in the accompanying drawings.

It is generally recognized in the art that thermosetting, or reinforced thermosetting resin compositions in the form of syrup putties, impregnated cloths, etc. usually do not have a suitable balance of pertinent properties and normally cannot be successfully shaped, particularly they cannot be cold-formed. Thermosetting or reinforced thermosetting resin compositions are now generally formed by methods such as use of heated enclosing molds which constrain the shape until the thermosetting material is cured. These difficulties are more pronounced when more complex shapes are to be reproduced. In fact, heretofore, the shaping of thermosettable compositions to produce thermoset end products of desired shapes has been almost invariably performed in a hot mold which constrains the shape until the resin is set or cured. Typically in one such method, for example, resin, reinforcement, fillter, pigment, etc. are blended into a putty-like mix which is then deposited into the cavity of a matched die set assembled in a press. Suitable pressures and temperatures are applied to effect shaping and curing after which the molded set product is removed from the mold and trimmed to remove flash. Alternatively, a fluid thermosettable resin composition can be injected into a mold and shaped and cured to a thermoset end product by the application of suitable temperatures and pressures. "Thermosettable" or thermosetting, or crosslinkable, as the terms are herein employed, refer to the property which permits the composition to be cured or converted to a set condition by catalyst, heat, radiation, etc. so that it is thereafter stable against distortion by heat.

It is known that thermosettable compositions may be prestaged, i.e. partially crosslinked or cured, or the viscosity may be otherwise increased, e.g. using suitable combinations of catalysts or thixotropic agents, or fillers, and/or heat to render the composition easier to handle, e.g. as by imparting a semisolid consistency to the resin and then complete the forming using matched die sets at elevated temperatures and pressures. This intermediate composition, nevertheless, still requires constraint after it has been formed into the desired shape and until the shape is cured. The term thermosettable or thermosetting includes these partially crosslinked or partially cured compositions and the invention contemplates the use of such partially cured compositions in sandwich structures. The term thermoset composition is generally used in referring to the substantially completely cured composition.

Essentially the inventive concept involves the discovery that crosslinkable and reinforced crosslinkable polymeric compositions in some convenient form such as paste, putty, impregnated cloth, etc. can be processed by relatively simple and expeditious shaping techniques analogous to methods used in shaping metals, at essentially ambient temperature. Conditioning of the thermosetting layer for shaping, as contemplated by the invention, is accomplished by containing the crosslinkable polymeric composition, i.e. the thermosettable layer, between two face sheets of a material of sufficient ductility, e.g. thermoplastic layers, which per se or in combination with crosslinkable polymeric-core layer provides sufficient shape retention stability to the composite so constructed that it readily lends itself to successful shaping at ambient temperatures. The thermoplastic face sheets may be similar or different in composition. A composite of this kind in which a suitable selection of thermoplastic face sheets and thermosetting core of appropriate viscosity permits very rapid shaping of articles which, after shaping, are relatively immediately removable from the shaping apparatus and allowed to cure without external constraint. The fact that the article formed from such composites need not be confined while it cures is of important practical value.

Conversion of the core into a thermoset structure retaining the desired shape can be accomplished after removal from the shaping apparatus by any suitable mechanism including conventional curing techniques, i.e. curing by elapsed time of activated compositions, by the application of heat and/or radiation, incorporation of catalyst and/or accelerators, exposing to ultra violet light, subjecting to ultrasonics, etc. It is generally desirable, and frequently advantageous, to select thermoplastic face sheet materials and crosslinkable or reinforced crosslinkable polymeric-core compositions which, in the course of conversion of the core to the thermoset state will bond sufficiently to the face sheets to form integrally bonded composite structures. The composite structures, because of the wide range of selection of each of the two components of the combination, i.e. of the variety of thermoplastic and thermosetting compositions, are versatile. After curing the composites can be selected to possess a unique balance of physical and chemical properties which offer significant production economies over competitive commercially produced composites. Such laminar structures are of major interest in the field of shaped articles of construction.

As seen by reference to the accompanying drawings, a composite sheet which is capable of being formed into desired shape by a relatively short cycle and at ambient temperatures to produce a thermoset composition offers clear advantages over a procedure which requires that the thermosettable composition be shaped and constrained in the shaping mechanism until the composition has cured at least to the point where the shape is self-sustaining and the shaping apparatus can be removed without danger of losing the desired shape.

Figures 1, 2:
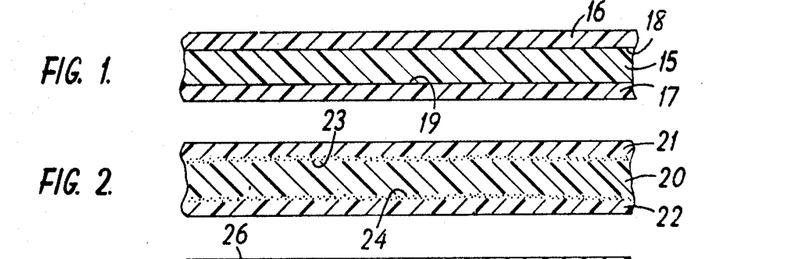
FIG. 1 depicts a composite in accordance with the invention in which a thermosettable layer is sandwiched between thermoplastic layers.
FIG. 2 depicts an alternate composite wherein the thermosettable core is adhesively secured to the outer sandwiching thermoplastic layers as the composite is assembled.

Referring to the drawing, FIG. 1 illustrates a simple three layer composite where a central thermosettable composition 15 is sandwiched between outer thermoplastic layers 16 and 17. In this composite, the layers prior to shaping may or may not be in adhesive relationship at the interfaces 18 and 19. However, following shaping and conversion, i.e. curing, of the central layer 15, an integral structure wherein all three layers are in adhesive relationship is contemplated whether by chemical or mechanical bond.

In the embodiment of FIG. 2, a composite comprising a central or core layer of thermosettable plastic composition 20 is sandwiched between outer thermoplastic layers 21 and 22 and is distinguished from the composite of FIG. 1 in that prior to forming it is in adhesive relationship at 23 and 24, providing an integral unit upon assembly.

Figure 3:
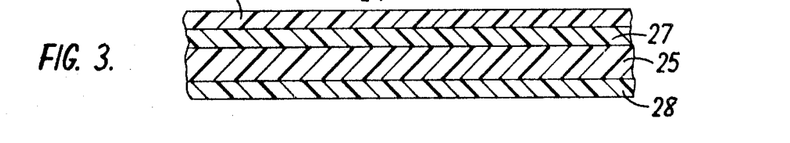
FIG. 3 depicts still another modification wherein the composite contains a layer, in addition to the thermosetting core and thermoplastic face sheets, which may be for decorative or other useful purpose.

The composite of FIG. 3 illustrates an additional or fourth layer 27 in combination with a thermosettable core 25 both of which are sandwiched between thermoplastic outer layers 26 and 28. This additional layer may be employed to impart a variety of effects either functional or aesthetic, e.g. decorative, electrically conductive, etc. Although the additional layer 27 is depicted between the core 25 and face sheet 26, it will be apparent that it may be applied over the face sheet 26 depending on its composition and function.

It will be understood that the composite of FIGS. 1–3 are illustrative only and that any practical number of layers may be used in forming the thermosettable composite, it being only necessary that the outer lamina be thermoplastic and that the rigidity of the composite, that is, both the thermoplastic and the thermosetting layers in combination, be of such sufficiency that the composite, after it is shaped, is able to retain the desired shape without external constraint. This combination thus allows the thermosettable layer, to which the desired shape has been imparted, to be converted to the thermoset condition without losing the shape.

Figure 4A:
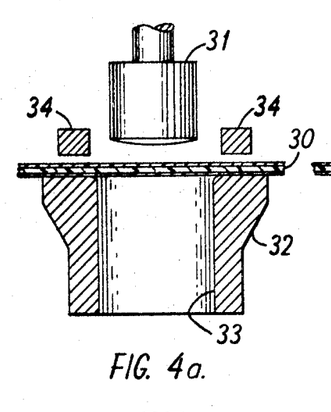
FIGS. 4a–4c is a diagrammatic sequence illustration of a deep drawing operation which comprises one shaping operation contemplated by the invention.
Figures 4B, 4C:
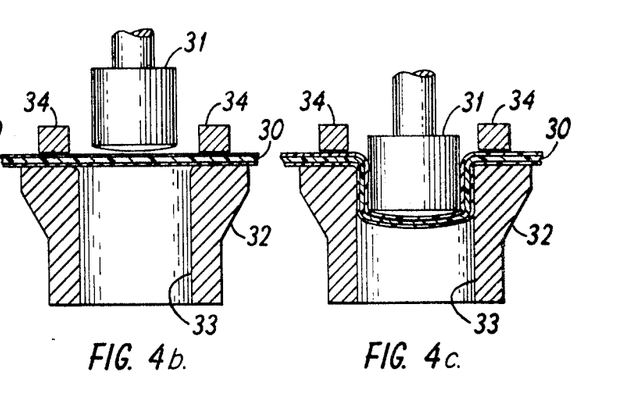

The sequence of FIGS. 4a–4c illustrate the forming operation wherein a composite blank 30 is positioned (FIG. 4a) on the die 32, the clamping ring 34 is brought into engagement with suitable pressure and yielding force on the composite 30 (FIG. 4b) and the ram 31 is lowered under pressure to impart to the composite blank 30 (FIG. 4c) the desired shape. The apparatus is conventional and generally comprises a ram 31 or plunger of appropriate shape working in combination with a female die member 32 to produce the desired shape. The ram 31 is adjusted so that it can be driven to any predetermined depth into the cavity 33. The annular clamping ring 34 which surrounds the opening of die 32 applies adjustable pressure to the edge of the composite sheet or blank 30 which is to be subjected to the drawing operation and allows suitable yielding, as is known in the forming art, to produce a substantially wrinkle free and shear free shape.

It is important that the pressure exerted by the ring on the blank 30 is properly adjusted. If the pressure is set too high, the blank may tend to break rather than "flow" into the cavity of the die, while a too low pressure may tend to wrinkle the periphery of the blank when it is forced into the die. These same considerations apply to deep drawing apparatus where the ring is set at a constant clearance rather than constant pressure. The forming cycle may be completed by a "push through" operation which leaves no rim on the formed piece (not shown) in a manner similar to that practiced in the draw forming of sheet metal stock.

Figure 5A:
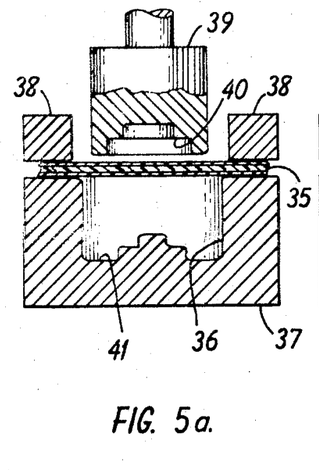
FIGS. 5a–5b is another sequence illustration of an alternate shaping operation utilizing the composite of the invention with a matched die.
Figure 5B:
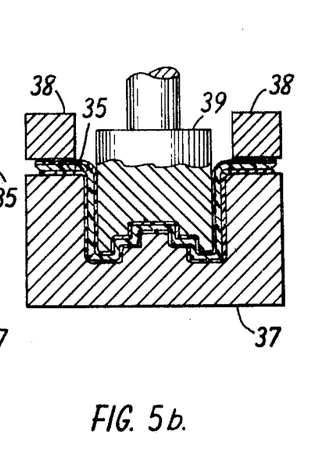

In FIG. 4 a single face die has been illustrated. Such dies are normally utilized for forming simple shapes. For more intricate shapes, it will be apparent that intricate appropriately contoured dies may be utilized and in fact may be required to produce the desired configuration. As shown in FIG. 5, a matched die operation is illustrated diagrammatically. The blank 35 to be shaped is positioned over the recess 36 of die 37 and held by the clamping ring on holder 38. A ram or punch 39 having a face configuration 40 which matches the die face 41 is brought down and forces the blank into conformity with the die confiuration (FIG. 5b).

Figure 6:
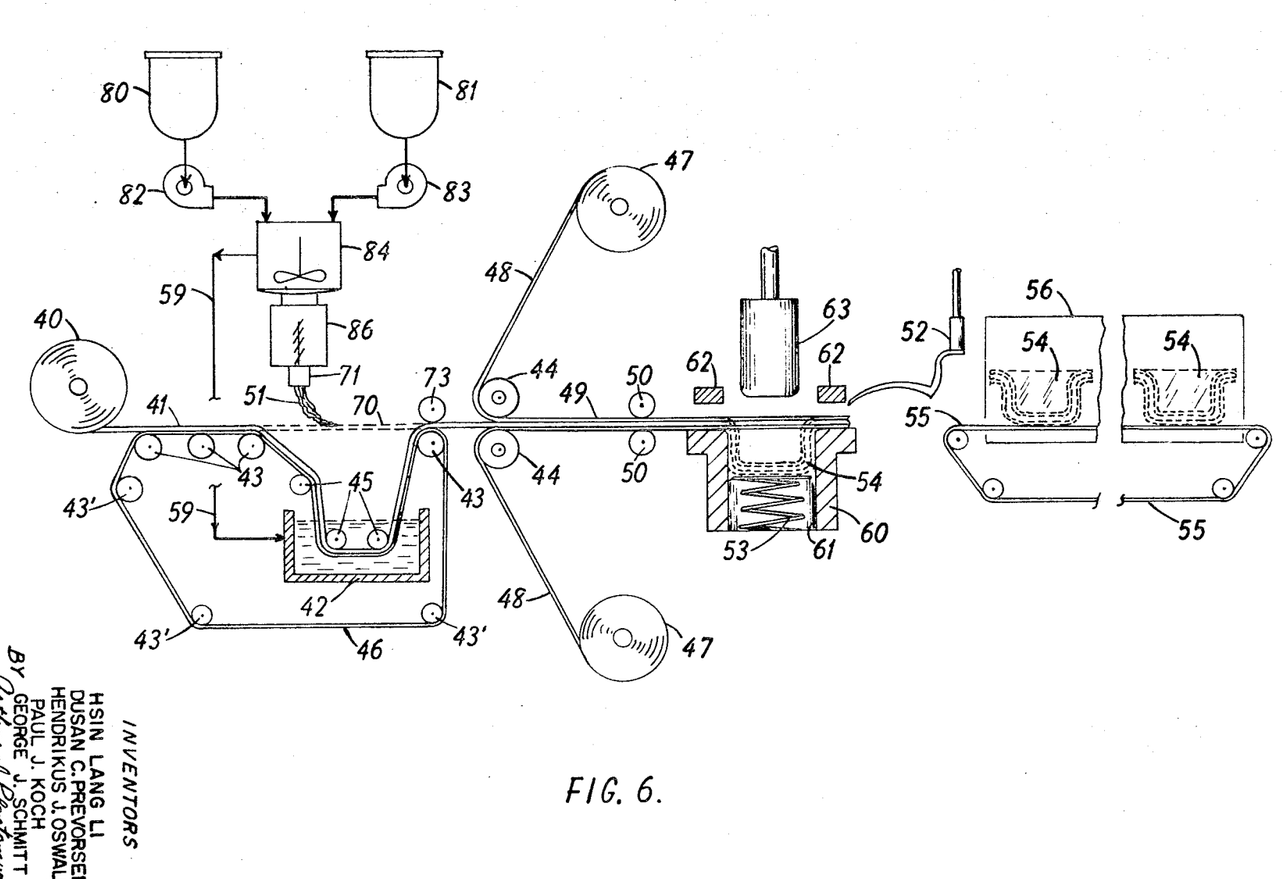
FIG. 6 is a diagrammatic flow diagram depicting two alternate illustrative continuous operations including assembly of the thermosettable composite, drawing of shapes from the composite, removal of the article from the shaping apparatus and curing means.

Referring to FIG. 6, a continuous operation, from fabrication of the layered composite to production and cure of the desired shape therefrom is depicted wherein, in order to make the description more specific, a composite comprising a glass filled polyester core sandwiched between layers of polyvinyl chloride will be described. It will be apparent, however, that a variety of different layer compositions in combination, as discussed hereinafter, is contemplated by the invention.

In the arrangement of FIG. 6, a glass fiber web 41 is unwound from feed roller 40 and passed over support rollers 43 and immersed with the aid of guide rollers 45 into the polyester resin impregnant contained in trough 42. The polyester composition is selected so that it has appropriate viscosity and so that cure to the thermoset condition does not occur until the desired time, i.e. at least until the sandwich has been formed into the desired shape. A system of this kind may be effected, for example, by use of a catalyst operable only at elevated temperature, e.g. as described in illustrative Example 14.

The glass web 41 optionally may be supported on a support strand, illustrated as a continuous conveyor 46 which is supported and guided on rollers 43 and 43' in its passage through the resin impregnant in trough 42. Support 46 has the advantage in that it tends to preclude disintegration of the mat.

As the impregnated glass fiber web leaves the trough 42, a roller 73 in combination with the contiguous roller 43 may be utilized to squeeze excess resin from the impregnated web. A second pair of rollers 44 affords suitable mechanism to bring the outer layers of polyvinyl chloride, i.e. the thermoplastic webs 48 unwound from roller 47, firmly into contact with the impregnated core web 41 to form the composite 49. The webs 48 in combination with the core should be of sufficient thickness and rigidity so that when the composite 49 is formed into the desired shape at ambient temperatures, such as by cold drawing, the shape will be maintained without external constraint thereon as the thermosettable core is converted to the thermoset condition. Generally, to satisfactorily effect this function, the ratio of the thickness of the core 41 to the total thickness of the outer webs 48 is about 1:10 to 10:1 and preferably 1:4 to 2:1, but it will be understood that this is not to be construed as a necessary limitation.

The assembled composite 49 may be further optionally passed through an additional set of gauge rollers 50 which, for example, may be moderately heated compressing rollers provided that curing systems or catalysts which do not become activated by temperatures of rollers 50, are employed. Such rollers may function to press and better adhere the layers together and increase the integrity of the composite. The composite may then be carried directly to a continuous forming die or it may be cut into appropriately sized blanks and packed for shipping or it may be subjected to a forming operation as described, for example, in conjunction with FIGS. 4 and 5 as depicted also in the next sequence of FIG. 6. After the blanks are formed into shaped articles 54, they are appropriately removed from the die recess 61 by any appropriate mechanism such as the transfer device 52, depicted diagrammatically, which may function in combination with eject spring 53 to lift the shaped article from the shaping die 60. The shaped articles may then be delivered to a take-away conveyor 55 which may carry them through an oven 56 for curing and thereafter optionally to trimming, finishing and/or assembly operations. The shaping apparatus depicted, as noted, is similar to that described in connection with FIG. 4 and comprises a die member 60 provided with a forming recess 61 upon which a blank to be formed is placed and held in place by a blank holding ring 62 and thereafter shaped by forming ram 63.

Resin utilized from trough 42 may be fed thereto from a mixing chamber 84 through a suitable line 59. A suitable system for preparing the core resin and feeding it to the chamber 84 and thence to extruder 86 and nozzle 71 is depicted, comprising a source of resin 80 and catalyst 81 which are fed through metering-pump devices 82 and 83 respectively.

With the aid of FIG. 6, as described hereinabove, and by additional structure shown in broken line in FIG. 6, an alternate system for preparing the composite of the invention is as follows:

A mat 41, such as woven or non-woven glass, is supplied from the roller depicted at 40 but instead of dipping through the tank 42, it is supported and carried in essentially a straight line as shown by the broken line 70. On this web a fairly viscous thermosetting composition is extruded at 51. The viscosity is such that the resin does not pass through the web 70 but is carried thereon. This web is then carried into the nip of contiguous rollers 73 and 43 which pressed the viscous thermosetting resin into the interstices of the glass fabric. Thereafter a pair of face sheets 48 are applied from rollers 47 onto this core and compressed to form an integral sandwich structure referred to here also as 49. The composite so formed may be processed in the manner described above.

Figure 7:
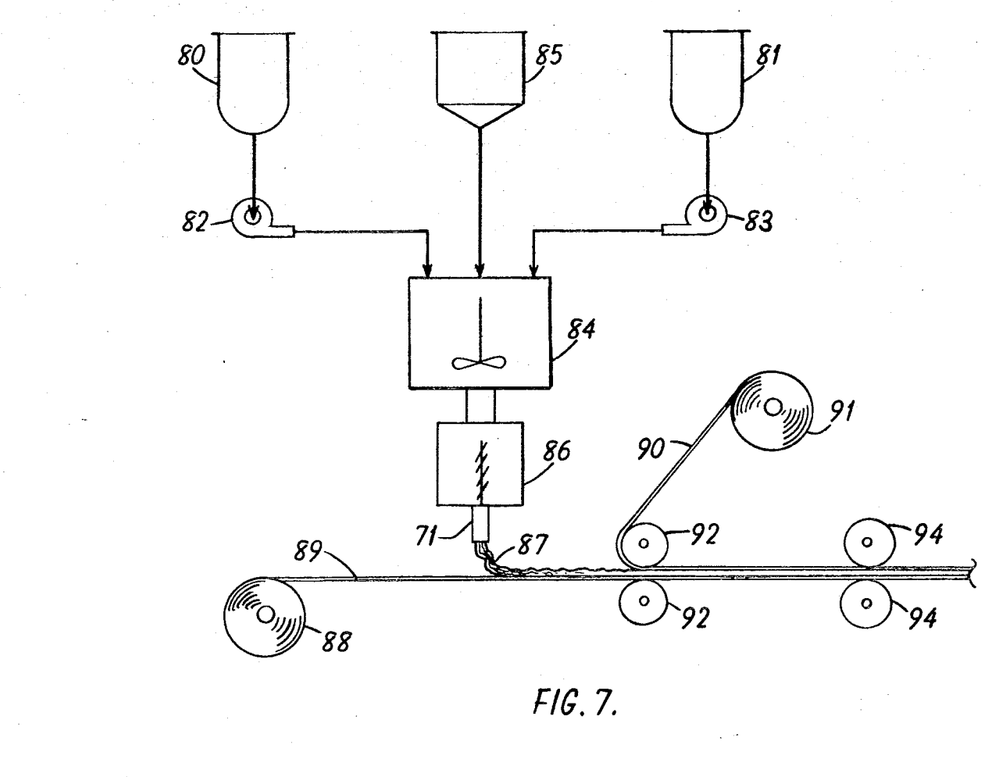
FIG. 7 is another illustrative diagram depicting graphically the formation of an alternate thermosettable sandwich structure wherein the thermosetting core layer is deposited by extruding or flowing a relatively thick composition on one of the thermoplastic face sheets and thereafter applying the other face sheet.

The schematic arrangement of FIG. 7 depicts a procedure wherein the thermosetting core is deposited directly onto one of the face sheets and thereafter the second face sheet is applied thereon. Referring to FIG. 7, resin and catalyst are fed from containers 80 and 81 by pumps 82 and 83, respectively, into a mixer 84. Blended into the mixer 84, for the purpose of adding body and reinforcement to the core, is chopped glass strand from container 85. The blend 87 of strand and resin from mixer 84 is suitably applied, as by extrusion from the head 86, onto a lower thermoplastic face sheet 89 which is fed from a supply 88. The blend may be suitably doctored on web 89. A second face sheet 90 from supply 91 is applied and the assembly is then passed through nip rollers 92 and 93 to improve adhesiveness between the core blend and the face sheets 89 and 90. Additionally, a pair of gauge rollers 94 may be employed to assure uniformity of thickness of the composite. The composite may then be shaped, shipped or stored until needed for shaping.

In order to produce composite structures having high strength to weight ratio, according to the teachings of this invention, it is preferable to use core compositions which are reinforced. Preferable reinforcing agents are glass fibers in the form of chopped strands, non-woven or woven mat, woven cloth, etc., also metal cores in the form of screens, etc., asbestos, etc. Suitable techniques for the preparation of the core composition and its assembling with the outer thermoplastic sheets depends on the nature of the reinforcing agent and the consistency of the resin composition. With high viscosity resins and reinforcement in the form of short fibers, it may be advantageous to prepare the core composition using a sigma blade kneading machine and extrude the composition directly onto one of the face sheets.

If the reinforcement is in the form of non-woven glass mats or woven cloth, it is possible to use other coating techniques for applying the resin to the reinforcement. For example, where the resin is dissolved in solvents or where prestaging agents with delayed action, such as magnesium oxide, are used, the resin may be applied by dipping or spraying on the fabric. If, however, the resin composition is of a high viscosity, then a curtain or film flow coating technique might be used more advantageously.

As has been noted hereinabove, it is essential that the composition of the core and the core-outer walls thickness ratio be such that the composite laminate has before curing both sufficient ductility to be shaped at essentially ambient temperature and sufficient rigidity to allow the execution of various consecutive shaping and finishing operations without requiring, i.e. employing an external constraining means such as a mold or other support in which to retain the shape after forming and until curing has been effected. The outer lamina of the composite, accordingly, have a multiple function: (a) to provide the desired surface properties and characteristics; (b) to represent an essential structural element contributing to the strength and ductility required for shaping; and (c) to constrain and reinforce the core before and during shaping, functioning thus in a sense as faces of a matching die set and to continue this function during the curing step until the core is converted into a rigid network; at this state the outer walls become an integral part of the structure bonded securely to the rigid core. Thus, in the final state, the core reinforces the walls and effectively contributes to their dimensional stability at elevated temperatures.

In order to obtain articles with the desired strength and rigidity, it is important that the core and the walls be bonded securely after the curing is completed. Good bonding is essential for acceptable performance at temperatures exceeding the glass transition temperature of the thermoplastic sheets, the temperature at which the thermoplastic sheets soften, lose their strength rapidly and tend to resume their initial configuration. The mechanical properties in this temperature range are due primarily to the properties of the core. As a result a rigid, heat stable core, which is bonded efficiently to the outer walls may increase considerably the application temperature of the laminate beyond that at which thermoplastic components above could be applied without reinforcement.

In forming the laminate contemplated by the invention, any of a variety of one or more of the known thermosettable resinous compositions may be employed to form the core lamina of the composite. For example, polyesters, substituted polyesters, e.g. chlorinated polyesters, phenolics, polyurethanes, melamines, epoxies, ureas, silicones, and the like may be used. These resins can be modified, for example, by admixing therewith various ingredients, e.g. thermoplastic polymers, such as polyvinyl chloride, polyethylene, polystyrene, and the like. Also, they may container fillers, reinforcing agents, thixotropic agents and the like and they can be prepolymerized or prethickened by some other means to the desired viscosity. Preferably, the core compositions contain epoxy, polyester or polyurethane resins.

Epoxy compounds included in the compositions of the present invention may be any of the known epoxy compounds which contain a plurality of epoxy groups of the structure Typical examples of such epoxy compounds include polyglycidyl esters of polybasic acids as disclosed in U.S. Pat. No. 2,866,767; polyglycidyl ethers of polyhydric phenols as disclosed in U.S. Pat. Nos. 2,467,171, 2,506,486, 2,640,037 and 2,841,595; and polyglycidyl ethers of polyhydric alcohols as disclosed in U.S. Pat. Nos. 2,538,072 and 2,581,464.

Curable polyester resins contemplated for the thermosetting core of the invention may be any of the known compositions which contain a polymer (a) and a monomeric component (b) i.e. one or more ethylenically unsaturated, polymerizable polyesters, polymers which contain, combined by ester linkages, radicals of one or more polybasic, particularly dibasic carboxylic acids and radicals of one or more polyhydric alcohols, particularly dihydric alcohols. Optionally, additional radicals of one or more of the following may be incorporated; monobasic carboxylic acids, one or more monohydric alcohols and one or more hydroxy carboxylic acids, at least some of said radicals having ethylenically unsaturated polymerizable groups, and one or more monomeric, ethylenically unsaturated, polymerizable compound. Typical resin compositions of this kind are disclosed in U.S. Pat. Nos. 2,225,313 and 2,667,430, for example. Modified resins of this kind are also disclosed, for example, in U.S. Pat. Nos. 2,628,209, 3,219,604 and the like.

Curable polyurethane resins included in the compositions of the invention may be any known products obtained by the reaction of polyesters or polyethers with diisocyanates. Typical examples of such resins are disclosed, for example, in U.S. Pat. Nos. 2,721,811, 2,620,-516, 3,061,497 and 3,105,062.

For achieving optimum properties in the final article and optimum ability to shape at ambient temperature, it is important that the resin composition of the core have a sufficiently high viscosity to prevent an excessive squeezing out of the core material during the shaping step in the press or mold and enough fluidity to wet the surface of the thermoplastic face sheets with which it is required to obtain bonding. We have found that for laminates having a core to skin thickness ratio in the range from 1:2 to 2:1, resin compositions having viscosities in the range from 200,000 to 1,000,000 centipoises usually fulfills these requirements. It should, however, be pointed out that with thin laminates and moderately deep articles, the viscosity can further be reduced while with articles with which the bonding between the outer sheets and the core is not critical (e.g. because it is provided by some mechanical means) cores containing higher viscosity resin compositions can be used. The core compositions can be filled and/or reinforced, they may also contain pigments, thixotropic agents, impact modifiers, etc. There are several ways to achieve and/or control the viscosity of the resin composition in the core. For example, with polyester resins, the viscosity of the resin composition can be increased by increasing the molecular weight of the base resin and/or by changing the composition of the base resin or by partial or complete substitution of styrene with some other monomers such as acrylamide, diallylphthalate, calcium acrylate, etc.

For economic purposes and/or to reduce the shrinkage of the resin during curing, it is sometimes advantageous to use fillers such as clay, asbestos, barytes, ground silica, magnesium carbonate, diatomaceous earth, etc. to increase the consistency of the resin composition. When high performance articles are the consideration, it might be advantageous to use polyester resins modified with metal oxides, hydroxides or alkoxides (as in U.S. Pat. No. 3,219,604). For example, the addition of magnesium oxide to the polyester resin results in a remarkable increase in the viscosity in comparison to a comparable unmodified polyester copolymerizable monomer composition containing the same percentage of copolymerizable monomer. In addition, the thickening effect of magnesium oxide can be controlled so that the viscosity increase takes place gradually over a period of several hours, thus assisting in the deposition of the resin applied to a glass mat in a very fluid state. In such cases a dip coating technique may be used while the subsequent thickening of the resin to the desired viscosity takes place when the core is sandwiched between two thermoplastic sheets. In the process, good wetting of glass and thermoplastic sheets is obtained which is required to obtain maximum mechanical properties and good adhesion.

Suitable thermoplastic materials which may be employed to sandwich the thermosettable core comprise a wide range of polymeric compositions, some of which may incorporate stiffening or reinforcement, such as wire mesh, to offset the tendency to springback by some thermoplastic sheets after they have been formed. Included, for example, are olefinic polymers such as polyethylene, polypropylene, and copolymers and terpolymers thereof, e.g. copolymers of ethylene and ethyl acrylate; vinyl polymers comprising one or more of the following monomers: vinyl aryls such as styrene, o-phenylstyrene, m-phenylstyrene, p-phenylstyrene, o-methylstyrene, m-methylstyrene, p-methylstyrene, o-methoxystyrene, m-methoxystyrene, p-methoxystyrene, o-nitrostyrene, m-nitrostyrene, p-nitrostyrene, and the like; vinyl and vinylidene halides, such as vinyl chloride, vinylidene chloride, vinylidene bromide, and the like; vinylesters such as vinyl acetate, vinyl propionate, vinyl butyrate, vinyl chloroacetate, vinyl benzoate, and the like; polycarbonates, that is, thermoplastics containing the following repeating unit:

wherein Ar is the residue of an aromatic dihydric phenol; cellulosics such as cellulose acetate, cellulose triacetate, cellulose acetate butyrate, cellulose propionate, ethyl cellulose, and the like; polyamides such as nylon 66, nylon 6, nylon 610, poly-m-xylylene, adipamide, polyhexamethylene terephthalamide, and the like; polyesters such as polyethylene terephthalate, polyethylene isophthalate, poly-(ethylene-2,7-naphthalate), poly(ethylene p,p'-diphenylate), various copolymers thereof, and the like; chlorinated polyethylene, chlorinated polyvinyl chloride, polyfluorocarbons such as polytetrafluoroethylene, polytrifluorochloroethylene, polyhexafluoropropylene and various copolymers and terpolymers thereof, as for example, copolymers of vinylidene fluoride and trifluorochloroethylene, and the like. Among the thermoplastic resins which are found to impart preferred results are: polycarbonates, polyvinyl chloride, polysulfones, cellulose acetate butyrate, chlorinated polyvinyl chloride and chlorinated polyethylene.

In the shaping of deep articles, particularly in deep drawn articles, by the above-described techniques, it is advantageous to use polymers which are impact modified. This is true regardless of whether the consideration is the shaping of thermoplastic sheet per se or in combination with suitable crosslinkable core compositions. With impact modified sheets, it is possible to obtain both deeper draws in a single step or faster closing cycles of the press or mold, which results in a higher production rate and thus, better economy.

In addition to known chemical impact modifiers, it is also possible to achieve considerable improvement in the performance of a given sheet stock in the press by treating the sheets mechanically. It has been recognized by prior art that deep drawing at ambient temperatures can be greatly facilitated if the thermoplastic sheets are either cold or hot rolled or cold or hot biaxially stretched before shaping. In addition to the before-mentioned improvements in the draw ratio and shaping cycle, such mechanical treatment also effects improvement in the uniformity of the thickness of the shaped article.

Additionally, various thermoplastic materials lack the ability to be cold-formed into permanently shaped structures because of their inherent elasticity. Consequently the internal stresses introduced during cold-forming result in considerable distortion of the shaped item on its removal from the die. In order to reduce this phenomenon which is usually referred to as "springback," it is advantageous to select sheetstock with poor elastic memory. We have found that many amorphous polymers having their glass transition above room temperature can be permanently deformed by cold-forming techniques. Furthermore, it is possible to modify polymers exhibiting a large springback by preparing composite sheetstock using inelastic components such as metal foils, screens, etc. Examples of such laminates would be polyethylene reinforced with aluminum screen, nylon laminated to metal foil, etc.

As a means of promoting an integral structure for the composite, a layer of short fibers interposed between the core and outer walls, i.e. for improving bonding between the thermoplastic walls and the core after the cure of the core is completed, may be employed. This mechanism can be applied also to shaped articles having steep or vertical walls or to articles having the core composition in the form of reinforced putty, cloth impregnated with high viscosity prestaged polymeric composition, or any other plastic high viscosity composition, if the core and the outer thermoplastic-fibrous laminates are shaped simultaneously. In some cases the resulting items have improved adhesiveness between lamina and hence are better integrated compared with those prepared by conventional multiple step incremental forming procedures. In addition, the production rate is greatly increased because the shaping involves only one, instead of three, operations. The employment of the fibrous layer to improve bonding between the core and the thermoplastic walls, rendered possible by the above-described shaping technique, therefore, also results in a considerable economy in the production of composite articles.

While the use of a thermoplastic-fibrous laminate to achieve the desired bonding between the core and thermoplastic layers may often be advantageous to produce a composite item with the outer wall securely bonded to the core after the cure of the core is completed, it should be expressly understood that the invention is not limited to the use of such a thermoplastic-fibrous laminate to achieve the desired bonding. It is readily apparent to those skilled in the art that the method herein described to achieve good bonding could be substituted with numerous other treatment, such as the application of adhesives, modification of the surface of the face sheets resulting in changes in the chemical and mechanical adhesiveness of the surfaces, or treatment of the surface so as to improve the "wetting" between the core and the sheet, etc., or any treatment suitable to cause the thermoplastic components to adhere better to the core when the cure is completed. Furthermore, there may be applications and/or core-skin combinations where the bonding achieved during curing would be sufficient without any special treatment.

We have found that composites prepared and shaped in accordance with the invention afford at least the following advantages: Tooling costs are reduced since conventional relatively simple shaping apparatus can be used. Forming dies, for example, can be made of low cost material such as plastic, wood filled plastic, or other reinforced polymeric material, etc. The number of processing steps are reduced since shaping and laminating is performed in a single step. The cold-forming process is extended to thermosetting materials which cannot be processed conventionally by single face contour dies, but need matched die tooling at elevated temperatures. The production of thermoset composite with a great variety of surface properties, finished and/or special decorative effects without additional post-processing setps such as sanding, painting, etc., is rendered economically attractive. The production of integrally bonded composites, in accordance with the invention, affords structures with greatly improved dimensional stability using both initially thermoplastic sheets and crosslinkable and/or reinforced crosslinkable resin compositions. It produces composite structures whose surface layers show significant improvements in dimensional stability compared to the same surface layers when processed without the crosslinkable or reinforced crosslinkable core compositions. It permits also the production of composites at very high processing speeds at ambient or even below ambient temperatures.

Additionally, the composite structures in accordance with the invention afford combinations of properties and advantages not readily and economically attainable by conventional methods; these properties can be readily tailor-made, i.e. controlled, to best fit specific end product applications by proper selection of components using only low cost tooling equipment. Some of these, for example, include: Impact resistance at both ambient and low temperatures; high elastic modulus at both ambient and elevated temperature; chemical resistance; outdoor weathering resistance; improved thermal and dimensional stability and abrasion resistance; favorable strength to weight ratios, permeability; flame or fire resistance; porosity; electrical properties; adhesion or abrasion characteristics; special functional or decorative effects.

It will be understood that an important feature of this invention resides in the structural properties available from the composites contemplated. During the shaping the thermoplastic top face sheet transmits the pressure from the forming apparatus, e.g. the ram to the core and onto the bottom face sheet or lamina and the two face sheets provide the necessary constraint to shape and maintain the core in the desired form. Thus, in a sense the thermoplastic sandwiching sheets function as if they were faces of a matching die system; however, with the distinction that the thermoplastic outer sheets themselves are shaped in the process. After the composite has been shaped, the core is still plastic and contributes little to the strength and dimensional stability of the shaped article. If the article were to be used in this state at elevated temperatures, above the softening point of the thermoplastic components, the latter would tend to resume their original configuration and the walls of the article would soon flatten out.

To improve dimensional stability and increase the strength and rigidity of the composite article, the shaped assembly is allowed to cure either at ambient or at an elevated temperature below the heat distortion temperature of the not-cured composite article. This temperature is usually near the glass transition temperature of the thermoplastic component(s) of the composite. Curing can also be achieved by induction heating or electron beam radiation or by dielectric heating if a suitable metal powder is incorporated in the thermosetting core. The curing temperature and time being dependent on the quality and nature of the crosslinkable resin composition and the nature and amount of catalyst system used.

Any of a variety of suitable means may be adapted to effect curing of the core. For example, a catalyst may be intimately admixed in the core composition which may be activated at an elevated temperature which is below the heat distortion temperature of the thermoplastic sandwiching layers. Illustration examples of systems of this kind are peroxides with or without promoters such as Co and V salts in a polyester core with thermoplastic sandwiching layers of polyvinyl chloride; boron trifluoride or tertiary amines in epoxy cores with thermoplastic sandwiching layer of polycarbonates or phenoxy resins. Alternately, an encapsulated catalyst wherein the capsule is ruptured during the forming operation may be employed so that after shaping, the formed shape is removed from the molding apparatus and allowed to cure unconstrained. Crosslinking may also be effected by heat alone at temperatures below the thermoplastic heat distortion temperature.

The ideal crosslinkable, initially thermoplastic material for the core should have both a long shelf and/or pot-life at ambient temperature. Additionally, an essentially instantaneous conversion into the crosslinked state, also at ambient temperature, may be a prerequisite. This objective may be achieved, for example, by proper selection of the thermosettable resin activating system. One such resin activating technique, for example, is exposing the thermosetting composite material to high energy radiation to cure it to the thermoset stage. Several types of radiation can effect curing, on e.g. high energy electrons, $\beta$-rays, $\gamma$-rays, X-rays, U.V. light, etc. The dosage requirements depend on several factors such as the chemical nature of the material to be crosslinked, its thickness, the penetrating power of the radiation used, etc. Thus, by proper selection of the radiation source the conversion into the crosslinked state can often be achieved almost instaneously. Since curing by means to radiation is usually performed at ambient temperature, the process can be used continuously using a conveyor which carries the desired shapes (containing either wholly or partially initially cured composite material) in front of the source of radiation in such a way as to expose the entire volume of the said composite to the radiation. As a result of such installation, very high production rates can be achieved without recourse to chemical diffusion controlled reactions which are difficult to control, or to prolonged heating and cooling cycles.

After the core is completely cured, it reinforces the thermoplastic walls, thus improving the strength of the final article and its dimensional stability at elevated temperature. It is significant that the dimensional stability of the cured composite often considerably exceeds the glass transition temperature of the thermoplastic components in the composite.

In order to obtain maximum improvement in properties, it is essential that after the curing the core bonds securely to the thermoplasic layers. Such bonding can be achieved in many ways. For example, treatment of the face sheets resulting in a partial imbedding of a large number of short cotton or rayon fibers onto the surface of the thermoplastic sheet (which are to be placed in contact with the core) often greatly improves the adhesion between the core and the face sheets of the composite. This improvement may be a result of the increase in the contact area, or could be due to the chemical bonding between reactive groups of the cellulosic fibers with the functional groups of the resin in the core, or may be a result of a combination of both these effects. However, as has been pointed out hereinbefore, it constitutes only one of the many ways in which good bonding can be achieved.

The following specific examples are given by way of further illustration. The specific recitation of ingredients and other details are not to be construed as limitations. The parts are given on a weight basis unless expressly noted otherwise.

EXAMPLE 1

This example illustrates the preparation of shaped articles from a sandwich assembly consisting of a layer of reinforced polyester resin interposed between two biaxially rolled sheets of polyvinyl chloride. The following composition is suitable for shaping by the above-described technique:

| | Parts |
|---|---|
| Polyvinyl chloride (each of two sheets 0.015" thick) | 60 |
| Fiber glass (woven cloth) | 20 |
| Medium viscosity general purpose polyester resin dissolved in 40 parts of styrene and activated with 0.015 part of cobalt octoate [1] | 20 |
| Methylethyl ketone peroxide | 0.2 |

[1] Polyester resin available commercially as Plaskon PE–251 from Allied Chemical Corporation can also be used.

Glass fabric was impregnated with the above-described polyester resin composition and interposed between two polyvinyl chloride sheets that were biaxially rolled from a thickness of 0.025" to 0.015". From this sandwich assembly a circular blank was cut having a diameter of 3.5" and placed immediately on the surface of the forming die and shaped into a cylindrical cup with a flat bottom of 2" diameter and a wall height of 0.6".

The shaped assembly was then removed from the press and allowed to cure at room temperature for 24 hours. The final article had the following properties (measured at the bottom of the cup):

Tensile modulus [1]—442,000 p.s.i.
Yield stress [1]—15,350 p.s.i.
Heat distortion temperature [2]—90° C.

[1] Tensile properties were determined according to the specification of "ASTM-Standard Plastics Methods of Testing, Part 27, June 1965, D–1708."
[2] The dimensional stability of formed articles at elevated temperatures was determined in a hot air oven permitting a nearly constant temperature rise of 2° C./min. The temperature, at which the top diameter of the shaped cup expands to 5% over the original top diameter is regarded as the heat distortion temperature.

A control, all polyvinyl chloride cup of similar dimensions, had a heat distortion temperature of 70° C., as determined by the same procedure.

EXAMPLE 2

This example illustrates the preparation of shaped articles from a sandwich assembly comprising a layer of glass reinforced polyester resin interposed between two biaxially stretched polyvinyl chloride face sheets. The following composition is suitable for shaping by the above-described technique:

| | Parts |
|---|---|
| Polyvinyl chloride (each of two sheets, 0.018" thick) | 65 |
| Fiber glass (woven cloth) | 20 |
| Medium viscosity general purpose polyester resin dissolved in 40 parts of styrene and activated with 0.015 part of cobalt octoate [1] | 20 |
| Methylethyl ketone peroxide | 0.2 |

[1] Plaskon PE-251 can also be used.

Preparation of the composite and shaping was performed in the same fashion as described in Example 1, with the exception that the polyvinyl chloride face sheets were biaxially stretched in hot air at 110° C. from an initial thickness of 0.30" to a final thickness of 0.018".

The completely cured cup had the following properties, determined as described in Example 1.

Tensile modulus—420,000 p.s.i.
Yield stress—16,000 p.s.i.
Heat distortion temperature—70° C.

EXAMPLE 3

This example illustrates the preparation of shaped articles from a sandwich assembly consisting of a layer of glass reinforced polyester resin interposed between two biaxially rolled polycarbonate[1] sheets. The following composition is suitable for shaping by the above-described technique.

| | Parts |
|---|---|
| Polycarbonate [1] (each of two sheets 0.018" thick) | 58 |
| Fiber glass (woven cloth) | 24 |
| Medium viscosity general purpose polyester resin dissolved in 40 parts of styrene and activated with 0.015 part of cobalt octoate [2] | 18 |
| Methylethyl ketone peroxide | 0.18 |

[1] Commercially available as "Lexan" from General Electric Company.
[2] Plaskon P-251 can also be used.

Preparation of the composite and shaping was carried out in a similar fashion to that described in Example 1. Polycarbonate sheets were biaxially rolled from an initial thickness of 0.30" to a final thickness of 0.018"

The completely cured cup had the following properties determined as described in Example 1.

Tensile modulus—450,000 p.s.i.
Ultimate tensile strength—19,200 p.s.i.
Heat distortion temperature—160° C.

An all polycarbonate cup of similar dimensions had a heat distortion temperature of 140° C.

EXAMPLE 4

This example illustrates the preparation of shaped articles from laminates consisting of a layer of glass reinforced epoxy resin interposed between two sheets of chlorinated polyethylene, containing 66 weight percent chlorine.

| | Parts |
|---|---|
| Chlorinated polyethylene (each of two sheets 0.016" thick) | 62 |
| Fiber glass (woven cloth) | 15 |
| General purpose epoxy resin of bis-phenol A type having a molecular weight of 380 and catalyzed and crosslinked with 10% by weight diethylene triamine [1] | 17.7 |

[1] Commercially available Shell epoxy resin sold under the trademark EPON 828 catalyzed with 10–12% by weight diethylene triamine can also be used.

The chlorinated polyethylene contained 66 weight percent chlorine and had an intrinsic viscosity of 3.0 as determined in ortho-dichlorobenzene at 100° C. The sheets were biaxially rolled from a thickness of 0.020" to 0.016".

A layer of glass cloth impregnated with the above-described epoxy resin composition was then interposed between the chlorinated polyethylene thermoplastic face sheets.

From this sandwich assembly a blank was cut and shaped into a cup as described in Example 1. After curing was completed, in a separate step without constraint, the article had the following properties measured as described in Example 1.

Tensile modulus—440,000 p.s.i.
Tensile strength—19,000 p.s.i.
Heat distortion temperature—120° C.

EXAMPLE 5

This example illustrates the preparation of shaped articles from a sandwich assembly consisting of two sheets of cellulose acetate butyrate which contain a layer of glass reinforced epoxy resin and where each of the two skin-core interfaces contain a layer of short fibers and where a large portion of these fibers is imbedded partially in the core and partially in the thermoplastic face sheets.

The following composition is suitable for shaping by the above-described technique; the parts being by weight:

| | Parts |
|---|---|
| Cellulose acetate butyrate (each of two sheets two sheets 0.030" thick) | 68 |
| Fiber glass (woven cloth) | 15 |
| General purpose epoxy resin of bis-phenol A type having a molecular weight of 380 and catalyzed and crosslinked with 10% by weight diethylene triamine [1] | 20 |

[1] EPON 828, catalyzed with 10–12% by weight diethylene triamine can also be used.

In order to secure good bonding between the thermoplastic sheets and core after the completion of the cure, a layer of cotton fabric was laminated onto one surface of the face sheets by compression molding at 150° C. After molding the excess of loosely bonded cotton fibers (or flock) was removed by brushing the surface with a steel brush. The so-prepared surface had a large portion of short fibers imbedded partially in the polymeric sheet and partially extending therefrom.

A layer of fiber glass (woven cloth) impregnated with the above-described epoxy resin was placed between two sheets of cellulose acetate butyrate in such a manner that the surfaces of the thermoplastic sheets treated with fabric were in contact with the epoxy resin core.

From this sandwich assembly a circular blank was cut and formed, as described in Example 1. The shaped assembly was then removed from the press and allowed to cure at room temperature.

The completely cured cup had the following properties:

Tensile modulus—240,000 p.s.i.
Tensile strength—10,400 p.s.i.
Heat distortion temperature—160° C.

It is noted that the relative heat distortion temperature of cellulose acetate butyrate, as such, is about 50° C. evidencing the marked increase obtainable by the composite structure.

EXAMPLE 6

This example illustrates the preparation of shaped articles from a sandwich assembly consisting of two acrylonitrile-butadiene-styrene sheets which contain a layer of glass reinforced epoxy resin. The following composition is suitable for shaping by the cold-forming technique contemplated by the present invention.

| | Parts |
|---|---|
| Acrylonitrile-butadiene-styrene (two sheets each 0.020" thick) | 59 |
| Fiber glass (woven cloth) | 18 |
| General purpose epoxy resin of bis-phenol A type having a molecular weight of 380 and catalyzed | | and crosslinked with 10% by weight diethylene triamine [1] _________________________________ 23.2

[1] EPON 828, catalyzed with 10–12% by weight diethylene triamine, can also be used.

Between two ABS sheets that were biaxially rolled from 0.030″ to 0.020″ was placed a layer of glass cloth impregnated with the above-described epoxy resin composition. From this sandwich assembly a circular blank was cut and shaped, as described in Example 1.

The fully cured structure had the following properties (measured at the bottom of the cup).

Tensile modulus—340,000 p.s.i.
Tensile strength—12,900 p.s.i.
Heat distortion temperature—100° C.

EXAMPLE 7

This example illustrates the preparation of shaped articles from a sandwich assembly consisting of two polysulfone sheets which contain a layer of glass reinforced polyester resin. The following composition is suitable for shaping by the above-described technique, the parts being by weight:

Parts
Polysulfone (Union Carbide 3500) (two sheets each 0.025″ thick) ____________________________ 58
Fiber glass (woven cloth) _______________________ 23
Medium viscosity general purpose polyester resin dissolved in 40 parts of styrene and activated with 0.015 part of cobalt octoate [1] _____________ 0.2

[1] Plaskon PE–251 can also be used.

Between two polysulfone sheets that were biaxially rolled from 0.040″ to 0.025″ was placed a layer of glass cloth impregnated with the above-described polyester resin and methyethyl ketone peroxide. From this sandwich assembly a circular blank was cut and shaped, as described in Example 1.

The fully cured structure had the following properties (measured at the bottom of the cup).

Tensile modulus—352,000 p.s.i.
Tensile strength—14,100 p.s.i.
Heat distortion temperature—125° C.

EXAMPLE 8

This example illustrates the preparation of shaped articles from a sandwich assembly consisting of two polyphenylene oxide sheets which contain a layer of glass reinforced polyester resin. The following composition is suitable for shaping by the above-described deep drawing technique. The parts given are parts by weight:

Parts
Polyphenylene oxide (General Electric) (two sheets each 0.027″ thick) ______________________ 61
Fiber glass (woven cloth) _______________________ 21
Medium viscosity general purpose polyester resin dissolved in 40 parts of styrene and activated with 0.015 part of cobalt octoate [1] _____________ 22
Methylethyl ketone peroxide ___________________ 0.22

[1] Plaskon PE–251 can also be used.

Between two polyphenylene oxide sheets that were biaxially rolled from 0.045″ to 0.027″ was placed a layer of glass cloth impregnated with the above-described polyester resin composition catalyzed with methylethyl ketone peroxide. From this sandwich assembly, a circular blank was cut and shaped, as described in Example 1.

The fully cured structure had the following properties (measured at the bottom of the cup).

Tensile modulus—336,000 p.s.i.
Tensile strength—13,600 p.s.i.
Heat distortion temperature—90° C.

EXAMPLE 9

This example illustrates the preparation of shaped articles from a sandwich assembly consisting of two sheets of a high molecular weight linear epoxy resin prepared by reacting on bisphenol-A with epichlorohydrin,[1] which contain a layer of glass reinforced polyester resin. The following composition is suitable for shaping by the above-described deep drawing technique, the parts being by weight:

Parts
Phenoxy (two sheets each 0.022″ thick) ________ 50
Fiber glass (woven cloth) _______________________ 28
Medium viscosity general purpose polyester resin dissolved in 40 parts of styrene and activated with 0.015 part of cobalt octoate _______________ 18
Methylethyl ketone peroxide ___________________ 0.18

Between two phenoxy sheets that were biaxially rolled from 0.030″ to 0.022″ was placed a layer of glass cloth impregnated with the above-described polyester resin composition and methylethyl ketone peroxide. From this sandwich assembly, a circular blank was cut and shaped, as described in Example 1.

The fully cured structure had the following properties (measured at the bottom of the cup):

Tensile modulus—375,000 p.s.i.
Tensile strength—13,400 p.s.i.
Heat distortion temperature—95° C.

EXAMPLE 10

This example illustrates the preparation of shaped articles from a sandwich assembly whereby the shaping is accomplished in more than one operation, all performed at essentially ambient temperature.

The sandwich assembly consists of a layer of reinforced polyester resin interposed between two biaxially rolled sheets of polyvinyl chloride. The following composition is suitable for shaping by the technique described below:

Polyvinyl chloride:
  Thickness of outer sheet 0.50″
  Thickness of inner sheet 0.70″
A layer of non-woven glass fibercloth impregnated with a polyester resin composition having a viscosity of about 800,000 centipoises (amount of glass ~25% by weight) [1]
Thickness of inner layer 0.60″

[1] Commercially available Allied Chemical Corporation polyester resin sold under the trademark Plaskon 750 can also be used.

A 9.0″ diameter circular blank cut from this assembly is placed over a forming die similar to that illustrated in FIG. 4 and shaped into a cylindrical cup with a flat bottom of 5″ diameter and a wall height of 1.5″. This constitutes the first step in the incremental shaping operation. Step 2 employs a second forming punch or ram, the bottom edge profile of which has a radius of curvature equal to 3.75″. This punch forces the bottom of the cup to become rounded. Step 3 is performed with a punch having a hemispherical profile. The final article has a bottom conforming to the dimensions of this latter punch and straight side walls, the total height is 2.75″. The overall wall thickness is substantially uniform for this three step operation compared to conventional single step forming which usually results in considerable thinning of the walls, particularly along the curvature of the bottom.

EXAMPLE 11

This example illustrates the preparation of rigid shaped articles from a sandwich assembly consisting of a layer of alkyd polyester resin interposed between two polyvinyl chloride sheets, the curing is achieved by irradiating the shaped article with high energy electrons, shaping and curing are performed at essentially ambient temperature and without constraint.

The sandwich assembly was prepared using a general purpose alkyd resin having a viscosity of about 800,000

[1] Available from Union Carbide Corporation under the trade name Phenoxy.

centipoises [1] rolled into the form of a sheet having a thickness of 0.020". This sheet was interposed between two polyvinyl chloride sheets that were biaxially rolled from a thickness of 0.025" to 0.015". From this sandwich assembly, a circular blank having a diameter of 3.5" was cut and placed on the surface of the forming die and shaped into a cylindrical cup with a flat bottom of 2" diameter and a wall height of 0.6". This cup was then cured by β-radiation.

EXAMPLE 12

A relatively high molecular weight polyester resin having a weight average molecular weight of 160,000 and an acid number of 12.5, prepared by reacting the following components:

| | Mols |
|---|---|
| Propylene glycol | 1.05 |
| Phthalic anhydride | 0.5 |
| Maleic anhydride | 0.5 |
| Glycerol | 0.01 | was mixed in the proportion of 77 parts by weight with 23 parts by weight of styrene and 8 parts by weight of polyvinyl alcohol. The resulting resin composition had a viscosity of 800,000 centipoises. The mixture is deposited onto a moving glass mat through a pressure head connected to a T-shaped extrusion head. The rate of deposition is adjusted so that the resulting impregnated layer contains 30% of glass by weight; three layers of so impregnated glass mat are placed between two polyvinyl chloride sheets of equal thickness. The total thickness of the laminate is 120 mil; the thickness of the core alone is 60 mil.

This laminate is shaped into a cylindrical flat bottom cup having a 5" diameter by the above-described deep drawing technique. A cure of the core to the thermoset condition is achieved by exposing the shaped article to a β-radiation dosage of 5 megarads provided by a "Dynamitron accelerator" constructed by Radiation Dynamics, Inc. The operating voltage is 1,500,000.

EXAMPLE 13

A resin impregnated glass fiber mat having a composition, as described in Example 12, was placed between two polyvinyl chloride sheets of equal thickness. The total thickness of the laminate was 30 mil; the thickness of the core was 30 mil. After shaping the laminate, as described in the previous example, the shaped cup was exposed to X-ray (WKα) radiation generated at a potential of 55 kilovolts, 45 milliamps at 3" source-sample distance for a total of 7 minutes. This radiation dosage was sufficient to convert the core to the thermoset condition.

EXAMPLE 14

A high molecular weight polyester resin having an average molecular weight of 160,000 and an acid number of 12.5, prepared by reacting the following components:

| | Mols. |
|---|---|
| Propylene glycol | 1.05 |
| Phthalic anhydride | 0.5 |
| Maleic anhydride | 0.5 |
| Glycerol | 0.01 | is mixed in the proportion of 77 parts by weight with 8 parts by weight of polyvinyl alcohol and 23 parts by weight of styrene to which 1 part by weight of benzoyl peroxide is added as catalyst. The resulting resin composition which had a viscosity of approximately 800,000 centipoises is extruded onto a moving fibrous glass mat by means of a pressure head connected with a T-shaped extrusion head. The rate of deposition is adjusted so that the resulting impregnated layer contains 30% by weight ---
[1] Plaskon 750.

of glass. Three layers of this impregnated glass mat are placed on top of each other and placed between two polycarbonate sheets and formed into a cup by means of the above-described deep drawing technique.

The conversion of the core composition into a rigid structure reinforcing the outer thermoplastic sheets is accomplished by heating the shaped article for 15 minutes at 100° C. A suitable procedure involves passing the shaped article continuously through an oven after the article is removed from the molding apparatus as depicted generally in FIG. 6.

EXAMPLE 15

A standard, general purpose, polyester resin of intermediate viscosity, is prepared by reacting the following components:

| | Mols. |
|---|---|
| Propylene glycol | 1.05 |
| Phthalic anhydride | 0.5 |
| Maleic anhydride | 0.5 | was mixed in the proportion of 70 parts by weight with 30 parts by weight of styrene and 1 part by weight of cobalt naphthenate. Shortly before the deposition of the resin on the glass mat, the resin composition was catalyzed by addition of 3 parts by weight of methylethyl ketone peroxide.

A glass mat was impregnated with the above resin composition by pouring and subsequent doctor-blading the semi-gelled solution to achieve the desired glass concentration which amounted to approximately 30 percent by weight. The resulting resin-glass composition was then placed between two polyvinyl chloride sheets and allowed to gel at ambient temperature until the core composition reached the desired consistency (ca. 600,000 centipoises). At this point, the laminate was subjected to a cold-forming operation as described above. The final cure of the core into a rigid network was completed without any external constraint on the shaped piece after the shaped article was taken out of the press at room temperature.

EXAMPLE 16

This example illustrates the preparation of shaped articles from a sandwich assembly consisting of two cellulose triacetate sheets and a glass reinforced polyester core. The following composition is suitable for shaping by the abovedescribed deep drawing technique. The parts are by weight:

| | |
|---|---|
| Cellulose triacetate (each of two sheets 0.020" thick) | 35 |
| Fiber glass (woven cloth) | 22 |
| Polyester resin composition | 43 |

The polyester resin composition and technique of deposition on glass was the same as described in Example 1. After cutting and shaping this laminate, as described in Example 1, the shaped cup was cured at room temperature for 24 hours.

EXAMPLE 17

A laminate, essentially as described in Example 16 was prepared and similarly cured with the exception that one of the cellulose triacetate face sheets was substituted with a polyvinyl chloride face sheet of the same thickness.

EXAMPLE 18

This example illustrates the preparation of shaped articles from a sandwich assembly consisting of two thermoplastic sheets of a high molecular weight linear epoxy resin prepared by reacting dicumyl phenol with epichlorohydrin, a resin hereafter referred to as cumoxy which contain a layer of glass reinforced polyurethane resin. The following composition is suitable for shaping by the abovedescribed deep drawing technique. The parts are by weight:

| | |
|---|---|
| Cumoxy (thickness of each sheet 0.025") | 63 |
| Fiber glass (woven cloth) | 22 |
| Polyurethane resin | 24 |

The polyurethane resin was prepared by reacting a polyether having a hydroxyl number of 443 with tolylene diisocyanate. 100 parts of polyether were placed into a resin flask equipped with a motor driven stirrer and vacuum outlet tube. With stirring, the temperature of the polyether was raised to 75° C. and this temperature was maintained for 30 minutes while the polyether was degassed under a vacuum of 3 to 10 mm. Hg. At the end of this time, the polyether was cooled to 50° C. and 68.8 parts of tolylene diisocyanate were added and degassing with stirring was continued for another 5 minutes. At the end of this period, a glass cloth was impregnated with this resin and sandwiched between two polycarbonate sheets. After cutting and forming this laminate, as described in Example 1, the shaped cup was cured at 100° C. for 4 hours.

EXAMPLE 19

This example illustrates the preparation of shaped articles from a sandwich assembly consisting of two nylon 6 sheets reinforced with aluminum foil and a glass reinforced polyurethane core. The following composition is suitable for shaping by the above-described deep drawing technique. The parts are by weight:

| | |
|---|---|
| Aluminum—Nylon 6 (two sheets each 0.035" thick) | 85 |
| Fiber glass (woven cloth) | 25 |
| Polyurethane resin | 25 |

The aluminum—nylon 6 sheets were prepared by hot molding of a 0.028" nylon 6 on a 0.08" aluminum foil. The urethane resin composition was the same as described in Example 18. The layers of the composite were assembled so that the nylon sheets faced the core. After the shaping of the laminate, as described in Example 1, the shaped cup was cured at 100° C. for 0 hours.

EXAMPLE 20

The procedure of Example 4 was generally repeated using the epoxy core composition identified as EPON 828 in Example 4. However, instead of chlorinated polyethylene face sheets, three separate runs using face sheets (a), (b) and (c), described below, were substituted.

Run (a) used face sheets of polyethylene in which a 10 mesh per linear inch steel screen (wire thickness of 20 mils) was embedded in polyethylene sheet of 35 mils thickness; run (b), used face sheets of a 60 mesh per linear inch aluminum screen wire thickness of 10 mils), embedded in a polyethylene sheet of 25 mils thickness; and run (c) used face sheets of 20 mil polyethylene sheet which incorporated a 5 mil aluminum sheet. The metal insert in each instance was incorporated with the polyethylene by heating and feeding the polyethylene sheet into the nip of pressure rollers with the mesh or foil so that the hot polyethylene at about 190° C. was pressed into intimate contact and bonded with the metal. The sheeting, so prepared, was formed into a composite laminate with an epoxy core. Articles cold-formed from the composite had no significant springback, i.e. retained their shape allowing the articles to be cured to the thermoset stage.

EXAMPLE 21

The procedure of Example 20, parts (a) and (c), were essentially repeated except that polypropylene face sheets of the same thickness were substituted for the polyethylene face sheets.

It is to be understood that the details and results presented in Examples 1–21 are illustrative only and are not meant to be limiting on either the composition of the layers, the properties of the shaped articles, the method of assembling and shaping, etc. The properties of the novel composites of this invention depend, of course, on such factors as the skin to core ratio, reinforcement loading, length/diameter ratio of the reinforcing particles, the degree of the crosslinking in the core (i.e. catalyst and chemical composition of the core) and the interfacial bond strength between the thermosetting core and thermoplastic outer sheets of the laminate.

It will be apparent to those skilled in the art in view of the nature of the inventive disclosure that various modifications may be effected without departing from the scope of the invention. The several details disclosed as illustrative should not be construed as placing limitations on the invention except as required by the appended claims.

We claim:

1. A method of forming a synthetic resinous thermosettable composite laminae comprising sandwiching a thermosetting lamina between outer layers of thermoplastic resin, shaping said composite in a forming apparatus at ambient temperature to the desired shape, said composite being retained in the forming apparatus for a period of time sufficient to shape the thermoplastic layers into the desired shape and said thermoplastic layers being of sufficient rigidity to retain the shape imparted to said composite, removing said shape from the forming apparatus with the thermosetting lamina in a substantially uncured state, and curing the thermosetting lamina of said composite while said shape is free of external constraint.

2. A method for forming articles from sheet plastic material comprising in combination the steps of: disposing a lamina of thermosetting resin between layers of thermoplastic resin to form a layered composite assembly, shaping said composite assembly to the desired shape in a forming apparatus at ambient temperature, said composite being retained in the forming apparatus for a period of time sufficient to shape the thermoplastic layers into the desired shape and said thermoplastic layers having at the time of forming the composite sufficient rigidity to retain the shape imparted to said assembly, removing said shape from the forming apparatus with the thermosetting lamina in a substantially uncured state, and curing the thermosetting lamina of said composite while said shape is free of external constraint.

3. The method of claim 2 wherein said thermosetting lamina is cured to a thermoset state by heating the formed layered assembly at a temperature below the heat distortion temperature of said thermoplastic layers.

4. The method of forming thermoset plastic shapes comprising cold-forming to the desired shape a composite consisting essentially of thermosetting lamina sandwiched between thermoplastic layers, shaping said composite in a forming apparatus at ambient temperature to the desired shape, said composite being retained in the forming apparatus for a period of time sufficient to shape the thermoplastic layers into the desired shape and said thermoplastic layers being of sufficient rigidity so that a desired shape imparted to said composite is retained without the need for external constraint, removing said shape from the forming apparatus with the thermosetting lamina in a substantially uncured state, and curing said thermosetting lamina to a thermoset condition while the desired shape is unconstrained.

5. A continuous method of forming thermoset plastic shapes comprising sandwiching a continuous lamina of a thermosetting resin between continuous layers of thermoplastic resin to form a composite, shaping said composite in a forming apparatus at ambient temperature to form the desired shape, said composite being retained in the forming apparatus for a period of time sufficient to shape the thermoplastic layers into the desired shape and said thermoplastic layers being of sufficient rigidity to retain the shape imparted to said composite, removing said shape from the forming apparatus with the thermosetting lamina in a substantially uncured state, and curing the thermosetting lamina of said composite to a thermoset condition while the desired shape is unconstrained.

6. The method of claim 5 wherein said lamina of thermosetting resin incorporates a web of fibrous material.

7. The method of claim 6 wherein the web of fibrous material is impregnated by passing it through a thermosetting resin impregnating bath prior to sandwiching it between said thermoplastic layers.

8. The method of claim 7 wherein the web of fibrous material is supported during its passage through said thermosettable resin on a supporting conveyor.

References Cited

UNITED STATES PATENTS

| | | |
|---|---|---|
| 2,796,634 | 6/1957 | Chellis _______ 156—196 X |
| 2,797,179 | 6/1957 | Reynolds et al. _____ 264—257 |
| 2,962,764 | 12/1960 | Trojanowski et al. __ 264—316 X |
| 3,082,485 | 3/1963 | Thomas _______ 156—196 X |
| 3,163,689 | 12/1964 | Ives _________ 264—90 |

SAMUEL W. ENGLE, Primary Examiner

U.S. Cl. X.R.

156—459, 585; 264—236

PO-1050
(5/69)

UNITED STATES PATENT OFFICE
CERTIFICATE OF CORRECTION

Patent No. 3,520,750  Dated September 14, 1970

Inventor(s) Hsin L. Li, Dusan C. Prevorsek, Hendrikus J. Oswald, Paul J. Koch and George J. Schmitt It is certified that error appears in the above-identified patent and that said Letters Patent are hereby corrected as shown below:

Column 7, line 38, "container" should be --contain--
Column 10, line 45, "setps" should be --steps--
Column 11, line 40, "layer" should be --layers--
Column 11, line 65, "to" should be --of''
Column 12, line 10, "thermoplasic" should be --thermoplastic--
Column 13, line 19 "0.30" to" should be --0.030" to--
Column 13, line 42, footnote 2 "P-251" should be --PE-251--
Column 15, line 31, "0.2" should be --20--
Column 15, after line 31, there should be inserted as line 32 --Methylethyl ketone peroxide....0.2--
Column 16, line 3, delete "on"
Column 18, line 71, Example 18 structure for the dicumyl phenol, between the second and third rings, insert $$\begin{array}{c} CH_3 \\ | \\ -C- \\ | \\ CH_3 \end{array}$$

Column 19, line 36, "0.08" aluminum" should be --0.008" aluminum--
Column 19, line 41, "0 hours" should be --4 hours--
Column 19, line 53, after "screen" insert -- ( --

Signed and sealed this 12th day of December 1972.

(SEAL)
Attest:

EDWARD M. FLETCHER, JR.
Attesting Officer

ROBERT GOTTSCHALK
Commissioner of Patents